US011399505B2

(12) United States Patent
Rossi

(10) Patent No.: US 11,399,505 B2
(45) Date of Patent: Aug. 2, 2022

(54) INFLATABLE PET BED WITH ODOR ABSORBING PROPERTIES

(71) Applicant: David P. Rossi, Winfield, IL (US)

(72) Inventor: David P. Rossi, Winfield, IL (US)

(73) Assignee: COCO+BEAN HOLDING, INC., Winfield, IL (US)

( * ) Notice: Subject to any disclaimer, the term of this patent is extended or adjusted under 35 U.S.C. 154(b) by 236 days.

(21) Appl. No.: 16/888,459

(22) Filed: May 29, 2020

(65) Prior Publication Data

US 2020/0375143 A1    Dec. 3, 2020

Related U.S. Application Data

(60) Provisional application No. 62/855,856, filed on May 31, 2019.

(51) Int. Cl.
| | | |
|---|---|---|
| *A01K 1/035* | (2006.01) | |
| *B32B 5/02* | (2006.01) | |
| *B32B 5/18* | (2006.01) | |
| *B32B 5/32* | (2006.01) | |

(52) U.S. Cl.
CPC .............. *A01K 1/035* (2013.01); *B32B 5/022* (2013.01); *B32B 5/18* (2013.01); *B32B 5/32* (2013.01); *B32B 2255/02* (2013.01); *B32B 2255/20* (2013.01); *B32B 2266/0278* (2013.01); *B32B 2307/744* (2013.01); *B32B 2307/758* (2013.01); *B32B 2479/00* (2013.01)

(58) Field of Classification Search
CPC .......... A01K 1/035; B32B 5/022; B32B 5/18; B32B 5/32; B32B 2266/0278; B32B 2307/758; B32B 2479/00
See application file for complete search history.

(56) References Cited

U.S. PATENT DOCUMENTS

| | | | | |
|---|---|---|---|---|
| 2003/0041808 A1* | 3/2003 | Wulforst | .............. | A01K 1/0353 119/28.5 |
| 2012/0291711 A1* | 11/2012 | Baker | .................. | A01K 1/0353 119/28.5 |
| 2016/0135422 A1* | 5/2016 | MacDowell | ......... | A01K 1/0353 119/28.5 |

* cited by examiner

*Primary Examiner* — Hai Vo
(74) *Attorney, Agent, or Firm* — Justin Lampel

(57) ABSTRACT

An inflatable pet bed for animals which incorporates a method for adjusting the firmness is provided. The inflatable pet bed may have a removable layer which has odor absorbing properties. The odor absorbing layer may be a machine washable carbon absorbing layer. Optional foam support layers may also be included within the interior of the pet bed. An exterior cover may protect the internal layers and may also be machine washable. The product may be compactly stored and transported.

9 Claims, 6 Drawing Sheets

INFLATABLE PET BED WITH ODOR ABSORBING PROPERTIES

CROSS REFERENCE TO RELATED APPLICATIONS

The following application is a based on and claims the priority benefit of U.S. provisional application Ser. No. 62/855,856 filed on May 31, 2019; the entire content of which is incorporated by reference.

BACKGROUND OF THE INVENTION

An inflatable pet bed for animals which incorporates a method for adjusting the firmness is provided. The inflatable pet bed may have a removable layer which has odor absorbing properties. The odor absorbing layer may be a machine washable carbon absorbing layer. Optional foam support layers may also be included within the interior of the pet bed. An exterior cover may protect the internal layers and may also be machine washable. The product may be compactly stored and transported.

Pet beds are common. For example, U.S. Pat. No. 8,567,347 to Leahy discloses a thermodynamic pet cooling station that uses conductive properties to transfer cold temperatures from a cooling element contained within an insulated base to the surface of a platform tile, creating an efficiently cooled area where an animal my rest when he/she is subjected to dangerously hot weather. The pet cooling station is thermodynamically cooled using three integral components: a molded insulated base, structural platform tiles made from a conductive metal comprised of a planar surface with temperature-transfer cases affixed to their underside, and cooling pods, that can be pre-frozen and are reusable, containing a non-toxic liquid that is housed in either a similar conductive metal or a durable membrane that will hold its shape and efficiently transfer the frozen temperature to the temperature-transfer cases allowing thermodynamics to follow the specific pathway of interconnected metal and move the cold temperature up and across the structural platform planar surface in an efficient manner. Once the frozen cooling pods are inserted into the temperature-transfer cases, and the structural tiles are lowered into the insulated base, the unit creates several hours of an efficiently cooled surface for the animal to enjoy without any human intervention.

Further, U.S. Pat. No. 7,921,807 to Arvanites discloses an inflatable bed filled with a fluid, whether it is a gas or a liquid, a desirable, in order to form a comfortable bed. The durable pet bed has at least two layers of bullet resistant fabric therein, with a fluid chamber therein protected on all sides by the bullet resistant fabric layers and capable of receiving a gas, fluid, gel, or liquid to provide comfort and safety for the pet using the bed.

Still further, U.S. Pat. No. 6,966,275 to Whitehall discloses an inflatable bed designed for pets having a bed comprises at least one, preferably at least two, separately inflatable members wherein said member or members is/are arranged so that when inflated the bed forms a concavity at the center at least when occupied by an animal and wherein said center may optionally contain a drainage hole extending through the body of the bed.

However, these patents fail to describe a pet bed having odor eliminating properties which is easy to use. Further, these patents fail to provide for a pet bed having odor eliminating properties which is both inflatable and washable.

SUMMARY OF THE INVENTION

An adjustable surface for animals that incorporates a method for adjusting the firmness is provided. The inflatable pet bed may have odor absorbing properties and may have a removable, washable layer. The pet bed has an air-filled inner mattress with an integral internal inflating device and a removable cover with an odor absorbing carbon layer that can be reactivated with normal washing. The product may be compactly stored and transported.

An advantage of the present the inflatable pet bed is that the present inflatable pet bed may be packaged in a space saving package that reduces transportation costs by, for example, reducing the size of the product by approximately 40-60% and therein reducing transportation costs.

And another advantage of the present the inflatable pet bed is that the present inflatable pet bed may allow a user to adjust the firmness of the pet bed.

Still another advantage of the present the inflatable pet bed is that the present inflatable pet bed may have multiple machine washable components, including an odor absorbing layer.

For a more complete understanding of the above listed features and advantages of the pet bed with odor absorbing properties reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

An inflatable pet bed for animals which incorporates a method for adjusting the firmness is provided. The inflatable pet bed may have a removable layer which has odor absorbing properties. The odor absorbing layer may be a machine washable carbon absorbing layer. Optional foam support layers may also be included within the interior of the pet bed.

An exterior cover may protect the internal layers and may also be machine washable. The product may be compactly stored and transported.

Figure 1:
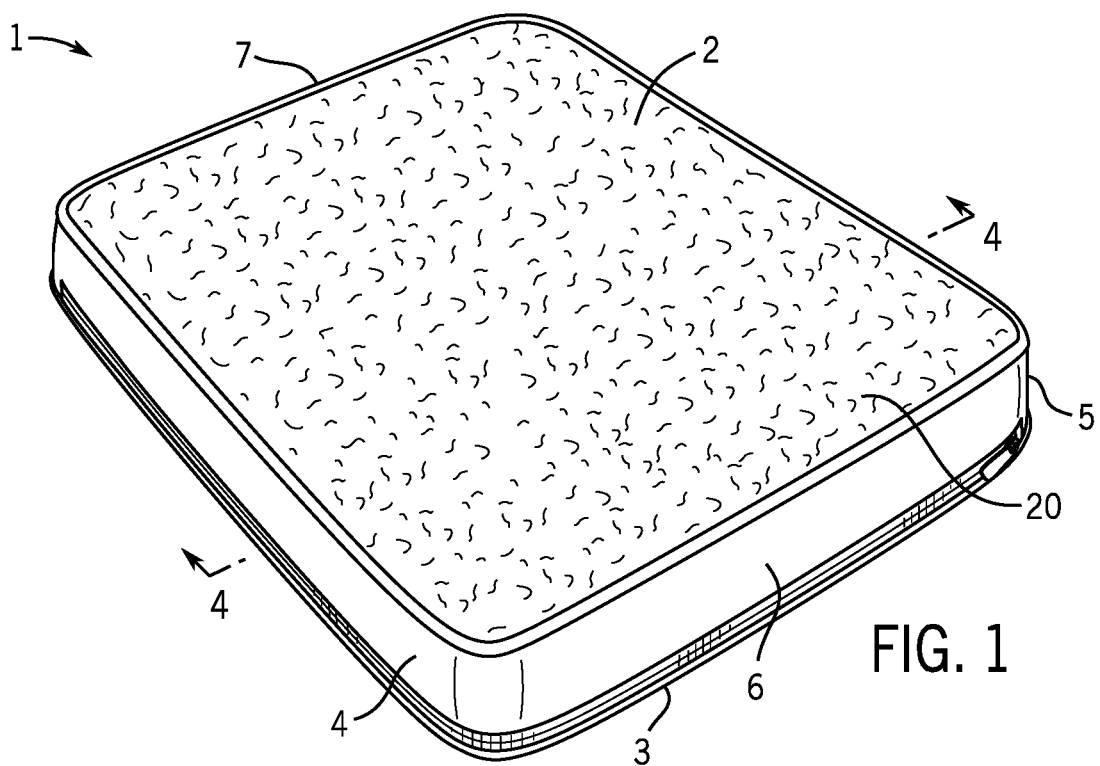
FIG. 1 illustrates a perspective view of the inflatable pet bed with absorbing properties in one embodiment.

Referring first to FIG. 1, in an embodiment, a pet bed 1 is provided. The pet bed 1 may have a top 2, a bottom 3, a first side 4, a second side 5, a front 6 and a back 7. The pet bed 1 may have multiple internal layers. In particular, the pet bed 1 may have, in an embodiment, an exterior removable cover 20, an internal inflatable air mattress (or "bladder") 40, an odor absorbing layer 60, a memory foam layer 80 and a polyurethane support foam layer 90.

In an embodiment, the air mattress 40 may be made of rubber and/or plastic and may provide an air-tight seal when sealed. It should be understood that the pet bed 1 may be used without all layers being present. In particular, a user may decide to leave out, for example, the memory foam layer 80 and/or polyurethane support foam 90 (as shown in FIG. 4 wherein those layers are removed).

In one embodiment, the memory foam layer 80 and/or the support foam 90 may be secured together as a single unit. The memory foam layer 80 may be made of, for example, visco-elastic foam for comfort while the support foam layer 90 may be made from, for example, a polyurethane foam. During use of the pet bed 1, the memory foam layer 80 and the support foam layer 90 may be located between the air mattress 40 and the exterior cover 20 for added support.

Figure 4:
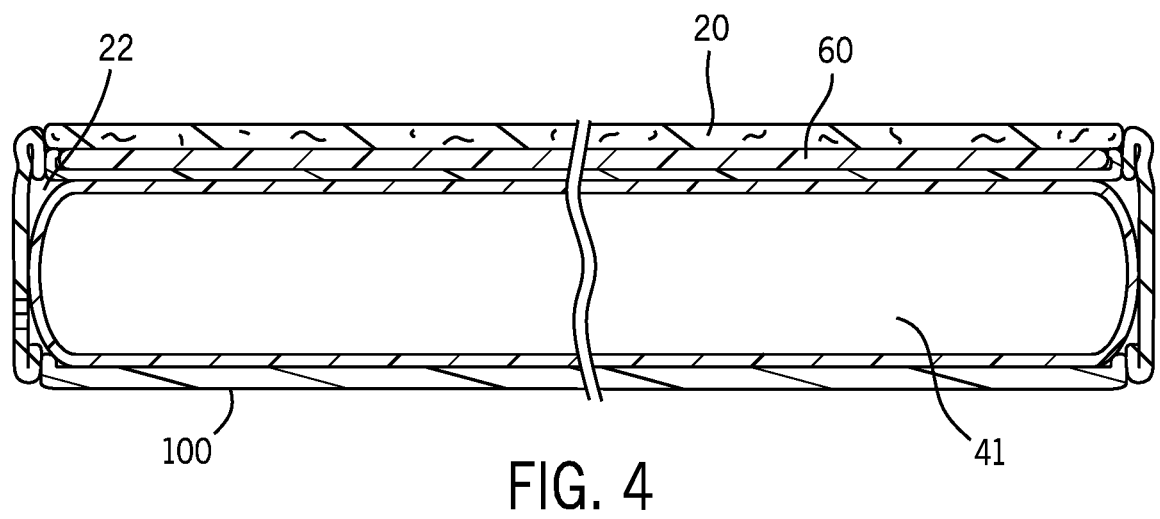
FIG. 4 illustrates a cross-sectional view of the inflatable pet bed with absorbing properties in one embodiment wherein the foam comfort layers is not utilized.
Figure 5:
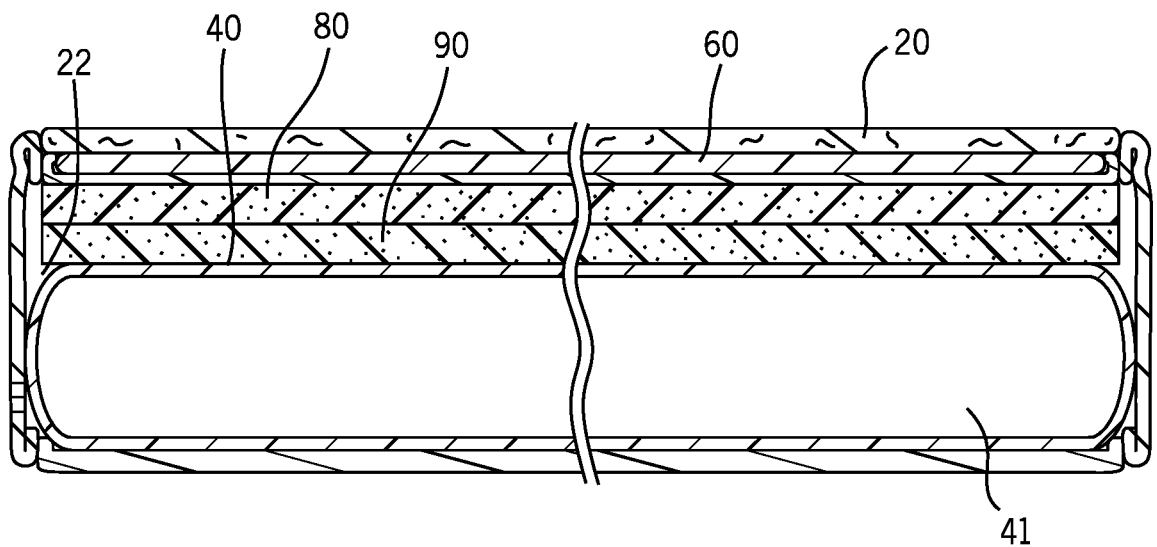
FIG. 5 illustrates a cross-sectional view of the inflatable pet bed with absorbing properties in one embodiment wherein the foam comfort layers are utilized.
Figure 7:
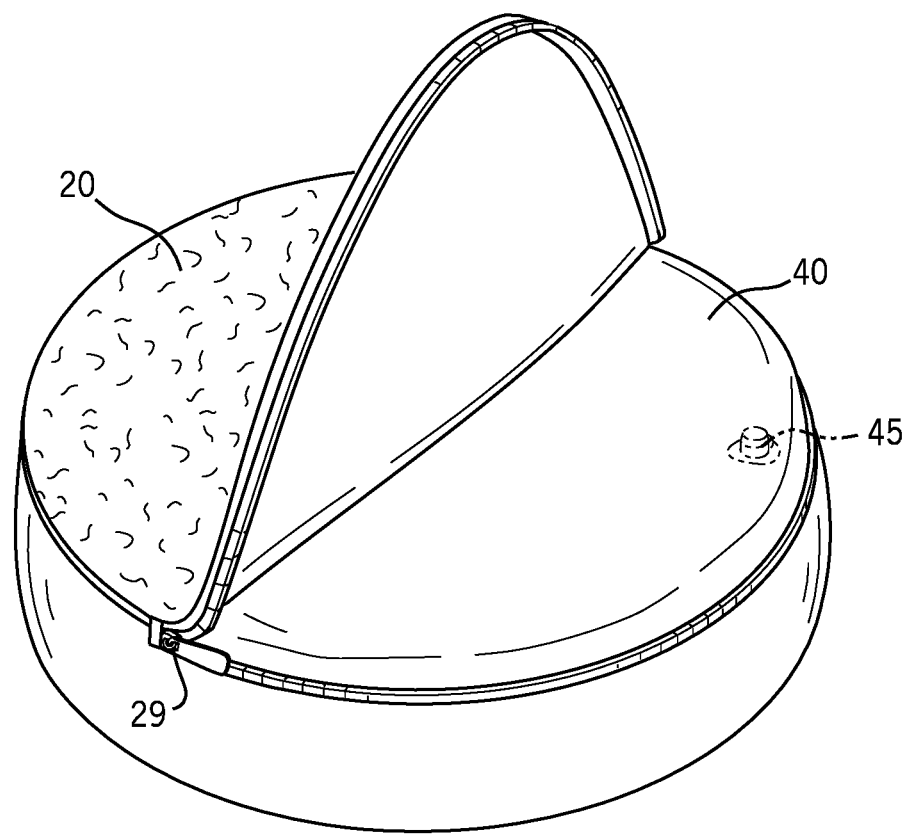
FIG. 7 illustrates a perspective view of the inflatable pet bed with absorbing properties with the top layer partially pulled back and the inflatable mattress exposed.
Figure 8:
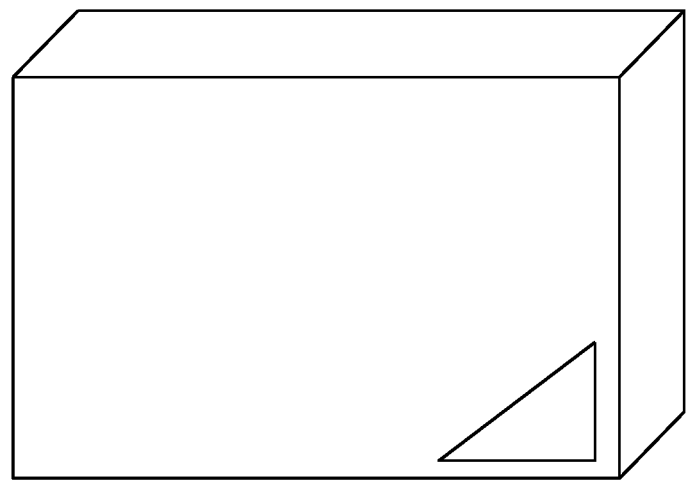
FIG. 8 illustrates a compact package of the present inflatable pet bed with absorbing properties in one embodiment.

The exterior cover 20 may have a zipper 29 (FIG. 7) which allows the exterior cover 20 to be opening up, exposing a hollow interior area 22 (visible in FIGS. 4 and 5). Preferably, the exterior cover 20 is a soft/plush layer which is still durable and machine washable. The exterior cover 20 may completely cover the interior layers of the pet bed 1 when the pet bed 1 is in use by a pet. More specifically, the exterior cover 20 may be the portion of the bed that a pet rests on and may be the only portion of the pet bed 1 exposed, therein protecting the interior layers.

Figure 3:
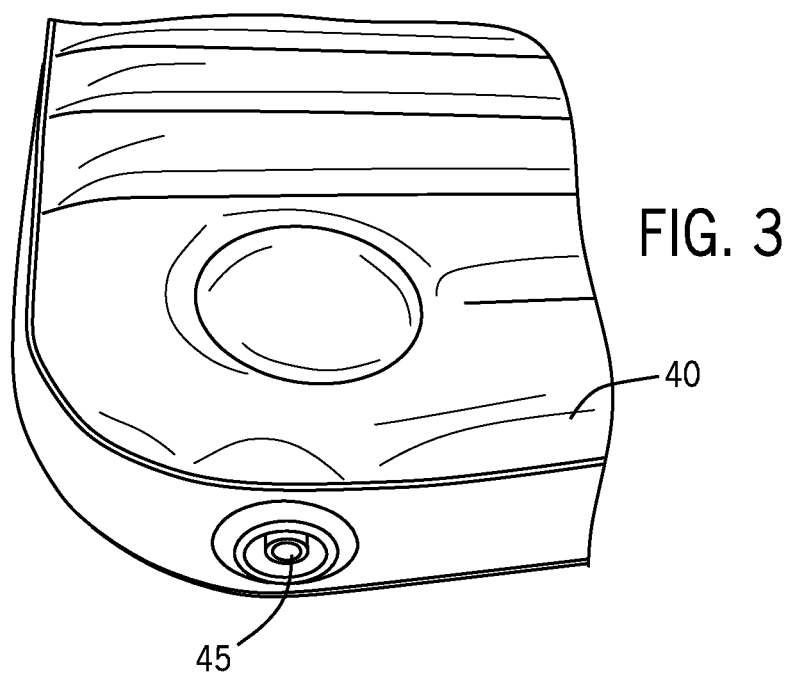
FIG. 3 illustrates a detailed perspective view of the port of the inflatable durable air mattress (or 'bladder') in one embodiment.

As stated above, the hollow interior 22 of the exterior cover 20 may receive the internal layers 40, 60, 80 and 90. The inflatable mattress 40 may have a hollow interior 41 and an opening port 45 (shown in various locations in FIGS. 3 and 7). The opening port 45 may allow a user to introduce and/or release air. In particular, a user may inflate the inflatable air mattress 40 to a desired firmness for his/her pet. The opening port 45 may have a one-way diaphragm which keeps air within the interior of the air mattress 40 while the air mattress 40 is being inflated.

Figure 2:
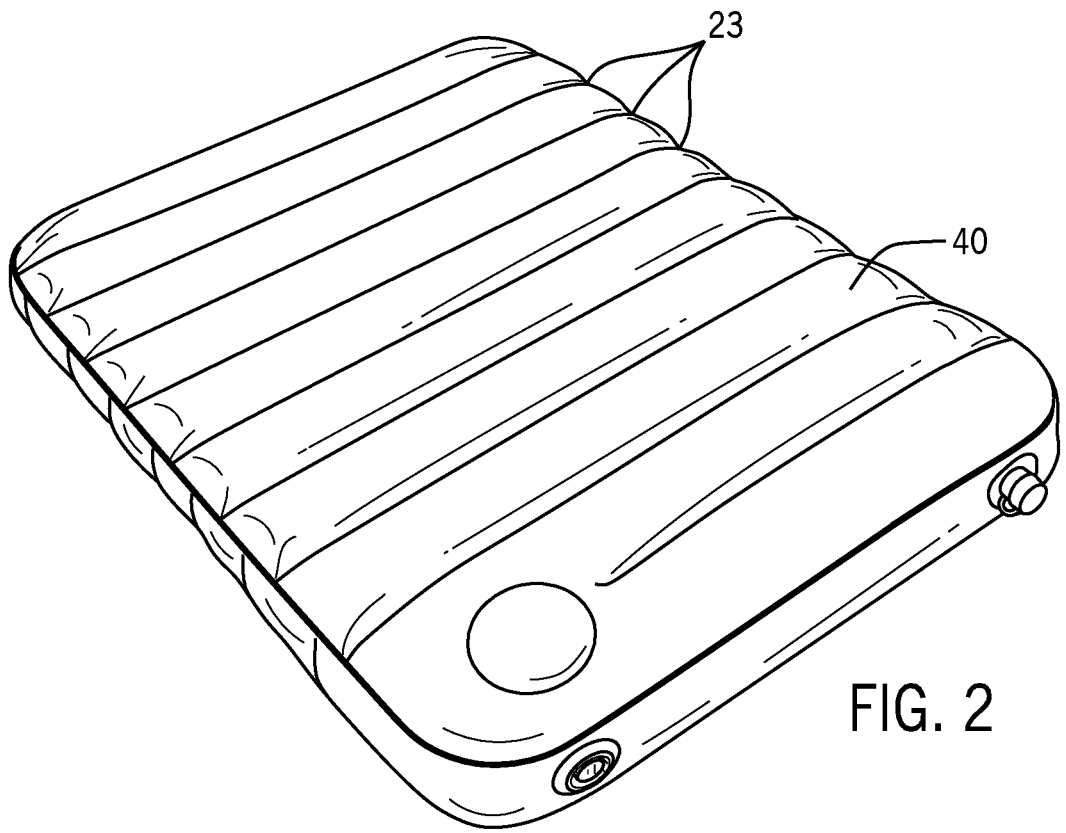
FIG. 2 illustrates a perspective view of the interior durable air mattress of the inflatable pet bed in one embodiment wherein the foam support, exterior cover and odor absorbing layers are removed.

In an embodiment, the present pet bed 1 only has ports 45 on the sides or ends of the air mattress 40 (as shown in FIG. 2) so that the port 45 does not cause discomfort for a pet resting on the top surface 2 of the pet bed 1. Prior art air mattresses for people often have ports on the top and/or on the bottom of the air mattress, cause discomfort for the individual in the area the port is located.

In addition, the inflatable air mattress 40 may be deflated and removed of air for transportation and/or storage. In an embodiment, the inflatable air mattress 40 has a plurality of recessed portions 23 (shown as parallel lines in FIG. 2). The recessed portions 23 may provide both improved comfort and traction for a pet. In an embodiment, a built-in pump (described below) may be connected to the port 45 to quickly inflate the air mattress 40.

In an embodiment, the pet bed 1 may have a removable odor absorbing layer 60. The odor absorbing layer 60 may be at least slightly smaller in size than the size of the exterior cover 20 so that the odor absorbing layer 60 may snugly fit below the exterior cover 20 which the pet is laying on, yet still substantially cover the air mattress layer 40. Preferably, the odor absorbing layer 60 predominately covers substantially the entire inflatable air mattress layer 40 so that the pet bed 1 provides optimal odor absorbing properties. In an embodiment, the odor absorbing layer 60 is made partially or substantially out of carbon. Further, in an embodiment, the carbon may be sprayed on a poly loft non-woven material and then heated so that the carbon bonds with the non-woven material.

Figure 6:
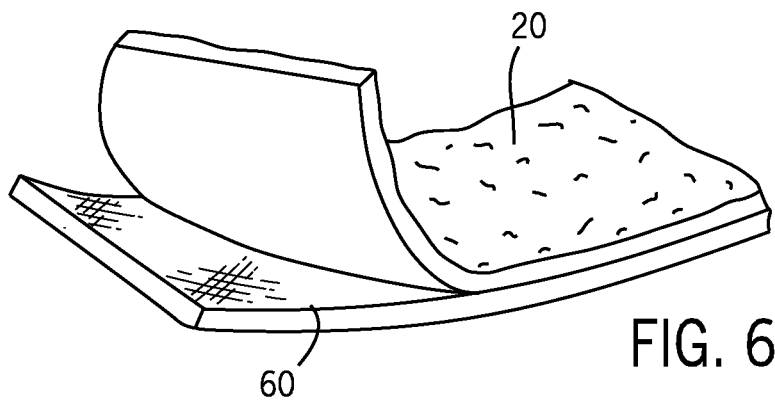
FIG. 6 illustrates a perspective view of the odor absorbing layer and the exterior cover layer.

In one embodiment, the odor absorbing layer 60 is sewn into the exterior cover layer 20 and these two layers act as a single layer for better support. FIG. 6 illustrates the exterior cover 20 and the odor absorbing layer 60 split for illustrative purposes, but the odor absorbing layer 60 and the exterior cover 20 may be sewn together in an embodiment and may act as a single, washable, unit. The odor absorbing layer 60 may be integral to the device 1.

In an embodiment, the bottom 3 of the exterior cover 20 may have a non-slip coating 100 (FIG. 4). As a result, the pet bed 1 is resistant to sliding which may otherwise often occur when a pet quickly jumps on or off a standard pet bed. Preferably, the non-slip coating 100 is rubber based, yet washable.

Figure 9:
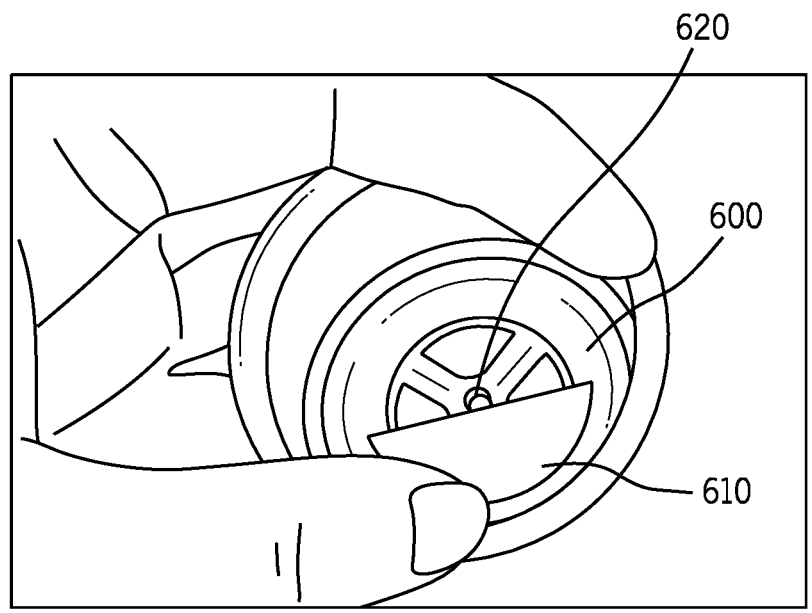
FIG. 9 illustrates a view of the port of the (foot) pump removed from the air mattress for better illustration.
Figure 10:
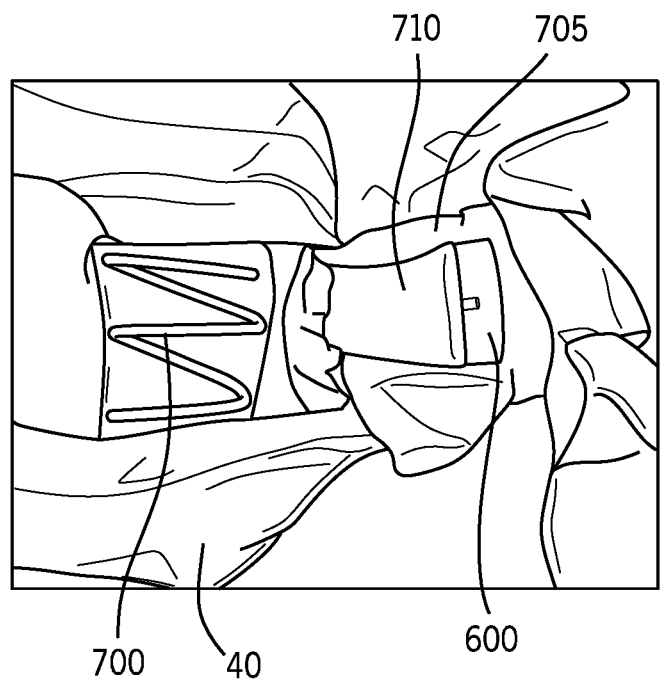
FIG. 10 illustrates a cut-away view of the (foot) pump and port of the air mattress.
Figure 11:
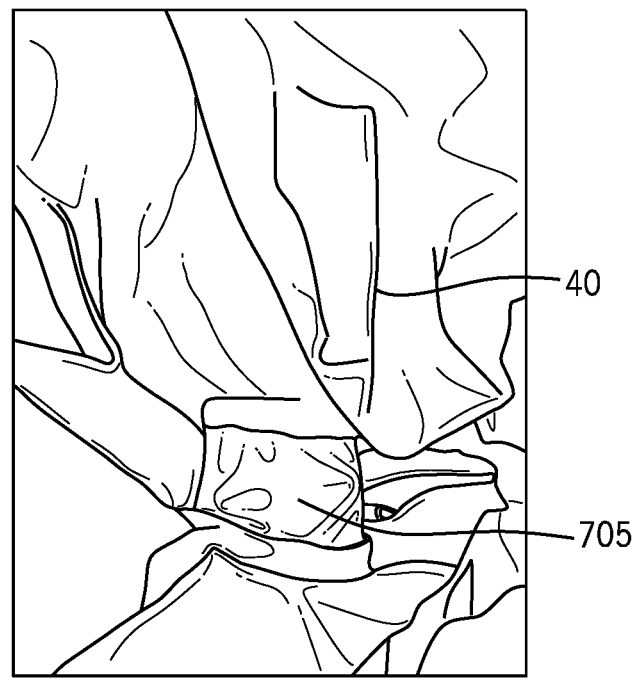
FIG. 11 illustrates a side view of the air mattress wherein the port and the (foot) pump are located within air mattress.

Finally, referring now to FIGS. 9-11, the air mattress 40 may have an internal pump and a valve 600; wherein the valve 600 is part of the opening port 45 of the air mattress. In an embodiment, the pump may be best operated by a foot of the user. The valve 600 may be generally cylindrical, having a pin 620 which secures a bendable, but durable membrane 610 which allows the flow of air in one direction. The valve 600 may be attached to a chamber 705; wherein the chamber 705 has an interior 710. A pump having an internal spring 700 may be located within the interior of the air mattress 40 at the port. As a person presses (or steps upon) the internal spring 700, the spring compresses and air is brought into the interior of the mattress 40. When the spring 700 is released, the spring expands 700 to its relaxed position allowing the outside air to flow through the diaphragm 610 and into the interior 710 of the chamber 705 wherein the process can be repeated until the air mattress 40 reaches a desired firmness. To release the air from the interior of the air mattress 40, a user would open a second port (illustrated on the right side of FIG. 2 on the front of the mattress).

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A multilayer pet bed comprising:
   a first layer wherein the first layer is inflatable;
   a second layer wherein the second layer is an odor absorbing layer made at least partially of carbon;
   a third layer wherein the third layer is a memory foam layer made of a visco-elastic foam;
   a fourth layer wherein the fourth layer is a support foam layer;
   an exterior cover wherein the exterior cover has a top, a bottom, a front, a back, a first side, a second side and a hollow interior and wherein the first layer, the second layer, the third layer and the fourth layer are capable of being removably inserted and secured within the interior of the exterior cover;
   wherein the first layer is disposed between the second layer and the third layer, and wherein the third layer is disposed between the first layer and the fourth layer.

2. The multilayer pet bed of claim 1 wherein the inflatable first layer has a port capable of accepting or releasing air to adjust the firmness of the inflatable first layer.

3. The multilayer pet bed of claim 2 wherein the port is located on a side of the first layer.

4. The multilayer pet bed of claim 1 further comprising: an anti-slip coating located on the bottom of the exterior cover.

5. The multilayer pet bed of claim 1 further comprising: a plurality of recessed portions on a top of the first layer.

6. The multilayer pet bed of claim 1 further comprising: a zipper located on the exterior cover wherein the zipper separates a portion of the exterior cover so that the interior of the exterior cover is accessible.

7. The multilayer pet bed of claim 1 wherein the exterior cover is machine washable.

8. The multilayer pet bed of claim 1 wherein the second layer is smaller than the exterior cover.

9. The multilayer pet bed of claim 1 wherein the odor absorbing layer comprises a non-woven layer and the carbon sprayed on the non-woven layer.

\* \* \* \* \*